(12) United States Patent
Cincotta et al.

(10) Patent No.: US 11,280,875 B2
(45) Date of Patent: Mar. 22, 2022

(54) VISIBLE LIGHT POSITIONING RECEIVER ARRANGEMENT AND TWO STAGE POSITIONING METHOD

(71) Applicant: MONASH UNIVERSITY, Clayton (AU)

(72) Inventors: Stefanie Cincotta, Rowville (AU); Adrian Neild, Toorak (AU); Jean Armstrong, Canterbury (AU)

(73) Assignees: Stefanie Cincotta, Rowville (AU); Adrian Neild, Toorak (AU); Jean Armstrong, Canterbury (AU)

(*) Notice: Subject to any disclaimer, the term of this patent is extended or adjusted under 35 U.S.C. 154(b) by 0 days.

(21) Appl. No.: 17/253,607

(22) PCT Filed: May 30, 2019

(86) PCT No.: PCT/AU2019/050547
§ 371 (c)(1),
(2) Date: Dec. 17, 2020

(87) PCT Pub. No.: WO2020/000021
PCT Pub. Date: Jan. 2, 2020

(65) Prior Publication Data
US 2021/0325505 A1    Oct. 21, 2021

(30) Foreign Application Priority Data

Jun. 29, 2018    (AU) ................................ 2018902351

(51) Int. Cl.
*G01S 5/16*    (2006.01)
*G01S 1/70*    (2006.01)
*H04B 10/116*    (2013.01)

(52) U.S. Cl.
CPC .............. *G01S 5/16* (2013.01); *G01S 1/7032* (2019.08); *H04B 10/116* (2013.01); *G01S 2201/025* (2019.08)

(58) Field of Classification Search
CPC .... G01S 5/16; G01S 1/7032; G01S 2201/025; H04B 10/116
(Continued)

(56) References Cited

U.S. PATENT DOCUMENTS

2009/0033757 A1    2/2009  Shimada
2009/0284366 A1*  11/2009  Haartsen ............. H04B 10/116
                                                                340/531
(Continued)

FOREIGN PATENT DOCUMENTS

CN    105509732 A    4/2016
KR    10-2010-0020338    2/2010

OTHER PUBLICATIONS

Armstrong, J. et al., "Visible Light Positioning: a Roadmap for International Standardization," IEEE Communications Magazine, vol. 51, No. 12, pp. 68-73, Dec. 2013.
(Continued)

*Primary Examiner* — Dalzid E Singh
(74) *Attorney, Agent, or Firm* — Culhane Meadows, PLLC

(57)    ABSTRACT

A visible light positioning receiver arrangement for obtaining spatial position information of the receiver arrangement from a plurality of luminaires (5), at least one of the luminaires including at least one associated modulated light source for transmitting a light signal providing positional information of one or more reference points associated with the luminaire, said receiver arrangement including: an imaging receiver for capturing an image of the luminaires and associated said reference point(s); and a non-imaging
(Continued)

receiver (7) for estimating an angle of arrival (AOA) of light from each said modulated light source, and for decoding the reference point positional information therefrom; wherein said AOA information and reference point positional information from the non-imaging receiver is matched to the image captured by the imaging receiver to obtain said spatial position information.

20 Claims, 4 Drawing Sheets

(58) Field of Classification Search
USPC .......................................................... 398/130
See application file for complete search history.

(56) References Cited

U.S. PATENT DOCUMENTS

| | | | |
|---|---|---|---|
| 2014/0093249 A1 | 4/2014 | Roberts et al. | |
| 2015/0147067 A1* | 5/2015 | Ryan ...................... | H04W 4/02 |
| | | | 398/118 |
| 2015/0276399 A1 | 10/2015 | Breuer et al. | |
| 2017/0237487 A1* | 8/2017 | Nyarko ................. | G01S 1/7038 |
| | | | 398/118 |
| 2017/0363462 A1* | 12/2017 | Armstrong .............. | H01L 31/08 |
| 2018/0219623 A1* | 8/2018 | Bitra .................... | H04B 10/116 |
| 2018/0287700 A1* | 10/2018 | Gummadi ............ | H04B 10/116 |
| 2018/0309928 A1* | 10/2018 | Kadambala ........ | H04N 5/23241 |
| 2019/0132055 A1* | 5/2019 | Deixler .................. | H05B 47/19 |
| 2019/0280769 A1* | 9/2019 | Verbrugh ............. | F21V 23/023 |
| 2020/0336207 A1* | 10/2020 | Luo ...................... | H04B 10/503 |
| 2020/0382212 A1* | 12/2020 | Engelen ............... | H05B 47/125 |
| 2021/0180955 A1* | 6/2021 | Yang .................... | G01C 21/206 |

OTHER PUBLICATIONS

Steendam, H. et al., "Cramer-Rao Bound for Indoor Visible Light Positioning Using an Aperture-Based Angular-Diversity Receiver", in 2016 IEEE International Conference on Communications (ICC), 2016, pp. 1-6.

International Patent Application No. PCT/AU2019/050547, Search Report and Written Opinion dated Aug. 20, 2019, 12 pgs.

Cincotta, S., et al., "Visible Light Positioning using an Aperture and a Quadrant Photodiode", IEEE Globecom Workshops, (GC Wksps) Singapore (Dec. 4-8, 2017), 6 pgs.

Kuo, Ye-Sheng, et al., "Luxapose: Indoor Positioning with Mobile Phones and Visible Light", MobiCom'14 Maui, HI, USA, ACM (Sep. 7-11, 2014), 447-458.

* cited by examiner

VISIBLE LIGHT POSITIONING RECEIVER ARRANGEMENT AND TWO STAGE POSITIONING METHOD

This application is a U.S. National Stage Filing under 35 U.S.C. 371 from International Application No. PCT/AU2019/050547, filed on May 30, 2019, and published as WO 2020/000021 A1 on Jan. 2, 2020, which claims the benefit of priority to Australian Patent Application No. 2018902351, filed on Jun. 29, 2018, each of which is incorporated by reference herein in its entirety.

FIELD OF THE INVENTION

The present invention is generally directed to visible light positioning (VLP) technology, and in particular, to a VLP receiver arrangement and two stage positioning method.

BACKGROUND TO THE INVENTION

While Global Positioning Systems (GPS) are now widely used to determine one's position in an outdoor environment, such technology is not suitable for many indoor applications. This is because it may not be possible to receive signals from GPS satellites while indoors or the accuracy provided by GPS may not be adequate. There are many potential applications for indoor positioning systems (IPS) which enable the spatial position of an object or person to be determined within an indoor environment.

For example, this can allow for a range of location based services (LBS). This can include services for asset tracking, such as for wheelchairs or mobile medical devices within a hospital, trolleys in an airport, or consignments in warehouses. More sophisticated systems may allow for ongoing tracking of mobile objects, such as a mobile robot or act as an aid for the visually impaired.

A promising solution for indoor positioning is Visible Light Positioning (VLP) technology. VLP makes use of luminaires. The primary purpose of luminaires is room illumination so luminaires are usually positioned so that they provide light throughout a room. Luminaires are typically installed near the ceiling. VLP requires that the light output of some of the luminaires be modulated. This may be achieved by modulating the light output from all or part of the luminaire or luminaires. The luminaire or part of the luminaire then acts as a positioning beacon by transmitting information through high frequency modulation of its light output. LED luminaires can be modulated at much higher frequencies than conventional luminaires making them ideal for this purpose. Using high frequency modulation avoids visible flicker of the luminaire which can potentially lead to adverse health issues. The use of alternative luminaire technology that still allows for high frequency modulation of the light output, such as laser illumination, is however also envisaged.

The aim of recent research in VLP technology is the development of visible light positioning receivers that can receive the transmitted information from the luminaires, separate those signals, and obtain the spatial location from that information. FIG. 1 shows a general VLP scenario where a person holds a positioning receiver which obtains modulated light signals from luminaires located in the ceiling containing information about the specific location of each luminaire. The spatial position of the receiver can then be determined using triangulation means. Current VLP systems are generally divided into two types, namely those that rely on an imaging receiver such as a camera, or non-imaging receivers such as photodiode arrays. Both of these systems however have drawbacks. While mobile phones having built in cameras have been considered as a possible receiver, the camera can only obtain a high definition image of the ceiling, and cannot receive and demodulate signals. This image does not provide any identity information for each luminaire in that image. This is because the camera is not designed to receive and decode high frequency signals from the luminaires. While, the use of a photodiode receiver could be used to receive the high frequency signal identifying each luminaire, they are not able to provide sufficiently accurate positioning.

Chinese Patent Application No. CN 105509732 A, in the name of "Academy of Opto-Electronics, Chinese Academy of Sciences" seeks to provide improved accuracy in spatial positioning by using a pair of imaging receivers in the form of a camera and a photodiode array setup, including a lens located over the photodiode array, as best shown in FIG. 4 of the Chinese application. The camera obtains two dimension coordinates of multiple luminaires, while the photodiode array obtains both an image of 'light spots' from the light emitted from each luminaire and projected onto the array by the lenses, as well as VLP information from each luminaire. The described system will however in practice have low spatial position accuracy because of the use of two imaging receivers. This is because the photodiode array setup relies on a projected image of light spots on the array. The shape of the 'light spot' however varies depending on the shape of the luminaires, and will in general vary widely. This inherently leads to inaccuracies in the spatial positioning determination.

The above discussion of background art is included to explain the context of the present invention. It is not to be taken as an admission that the background art was known or part of the common general knowledge at the priority date of any one of the claims of the specification.

It is therefore an object of the present invention to provide a VLP system having improved accuracy in the determination of a spatial position of a receiver over prior systems.

SUMMARY OF THE INVENTION

According to one aspect of the present invention, there is provided a visible light positioning receiver arrangement for obtaining spatial position information of the receiver arrangement from a plurality of luminaires, at least one of the luminaires including at least one associated modulated light source for transmitting a light signal providing positional information of one or more reference points associated with that luminaire, said receiver arrangement including:

an imaging receiver for capturing an image of the luminaires and associated said reference point(s); and a non-imaging receiver for estimating an angle of arrival (AOA) of light from each said modulated light source, and for decoding the reference point positional information therefrom;

wherein said AOA information and reference point positional information from the non-imaging receiver is matched to the image captured by the imaging receiver to obtain said spatial position information.

In the present application, the term "imaging receiver" refers to any apparatus that uses lenses to project an image onto an image plane, the image being recorded by the apparatus. By contrast, the term "non-imaging receiver" will be used to refer to apparatus that do not use any lenses for focusing an image.

The imaging receiver may be in the form of a camera, while the non-imaging receiver may be in the form of an aperture receiver.

The aperture receiver is preferably a quadrant angular diversity aperture receiver (QADA).

The modulated light source may be located on or adjacent to the luminaire. The modulated light source may emit IR or other light at a frequency not visible to a human eye.

The reference point may be the location of the modulated light source. Alternatively, or in addition, the reference point may be the location of a physical feature of the luminaire, for example, a corner or centroid of the luminaire. Alternatively, or in addition, the reference point may be one or more visible marks provided on or adjacent to the luminaire.

According to another aspect of the present invention there is provided a visible light positioning method for obtaining spatial position information of a visible light positioning receiver arrangement from a plurality of luminaires, at least one of the luminaires including at least one associated modulated light source for transmitting a modulated light signal providing positional information of one or more reference points associated with that luminaire, the method including:

a) obtaining an image of multiple luminaires and associated said reference points using an imaging receiver of the receiver arrangement;

b) estimating angle of arrival (AOA) information from each said modulated light source using a non-imaging receiver of the receiver arrangement;

c) further using the non-imaging receiver to receive said reference point positional information transmitted from each said modulated light source; and d) matching said AOA information and reference point position information from the non-imaging receiver with the image captured by the imaging receiver to thereby obtain said spatial position information.

The two stage approach in obtaining location details of the luminaires ensures more accurate determination of an indoor spatial position when compared with known VLP systems.

BRIEF DESCRIPTION OF THE DRAWINGS

It would be convenient to describe the invention with reference to the accompanying drawings which illustrate a preferred embodiment of the visible light positioning receiver according to the present invention. Other embodiments are possible, and consequently, the particularity of the accompanying drawings is not to be understood as superseding the generality of the preceding description of the invention.

In the drawings.

DETAILED DESCRIPTION OF THE INVENTION

Figure 1:
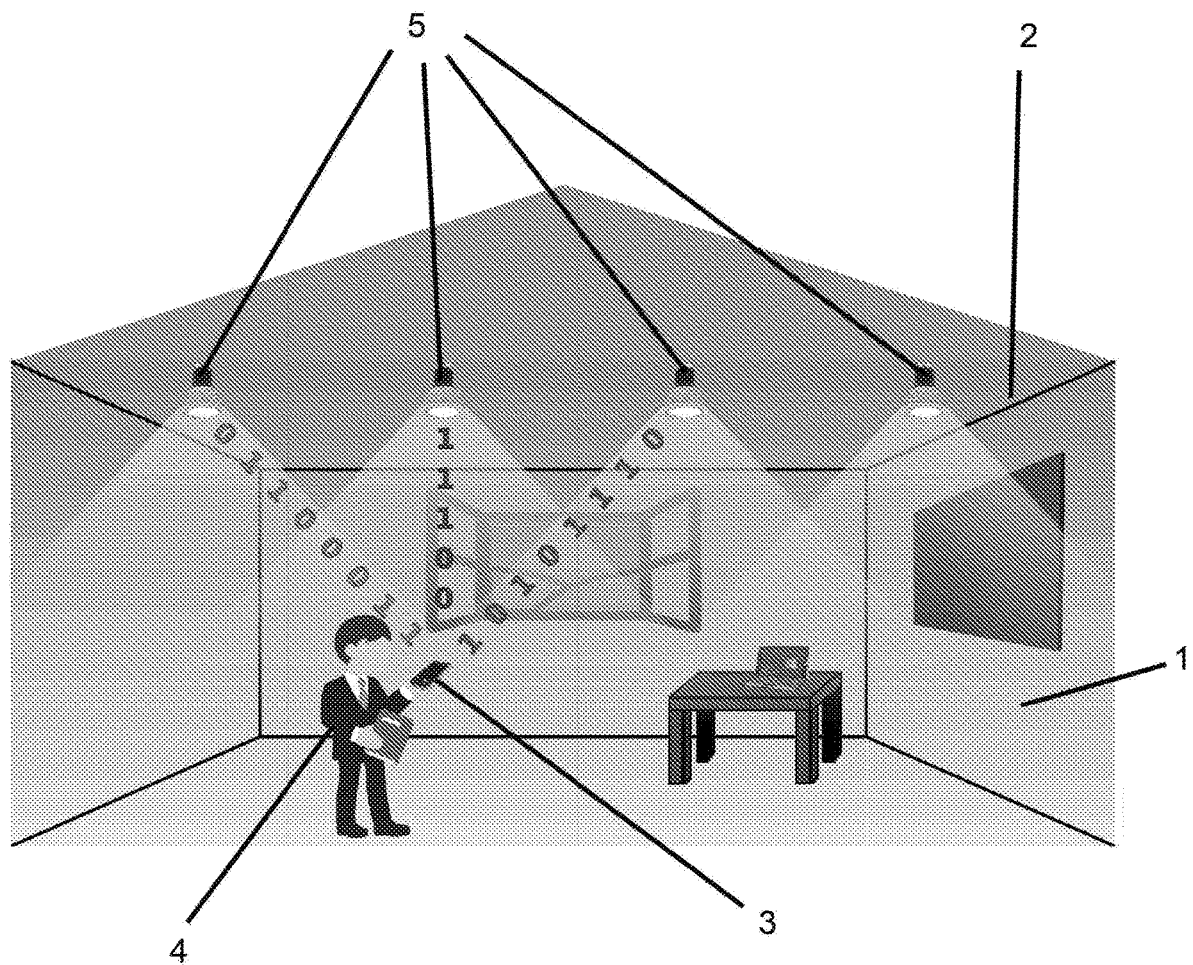
FIG. 1 shows a general scenario of a visible lighting positioning (VLP) receiver being used in a room having installed luminaires able to respectively transmit identification and possibly positioning information.

Referring to FIG. 1, there is shown a typical VLP scenario where a series of luminaries 5, typically LED lights, are located in the ceiling 2 of a room 1 of a building. At least one of the luminaires 5 can be or include a modulated light source for transmitting information through light modulation thereof, to a handheld visible light positioning (VLP) receiver arrangement 3. This receiver arrangement 3 provides spatial positioning information within the room 1 to a user 4 holding that receiver arrangement 3.

Existing VLP systems can be broadly categorised as ones using camera-based receivers, or ones using photodiode-based receivers. Both of these approaches have significant drawbacks. It is difficult to design a camera-based system that can also receive and decode modulated signals. While typical mobile phone cameras could use a "rolling shutter" to read modulated signals above the visible flicker range, limitations in this technology prevent them decoding modulated light signals at high frequencies. While a photodiode receiver can readily detect high frequency signals, they are unable to obtain the spatial position of each luminaire with the same accuracy as a camera.

The present invention therefore seeks to enable improved accuracy in the determination of a spatial position by providing a two stage positioning method and associated visible light positioning (VLP) receiver. In particular, the present invention combines information obtained from both an imaging receiver and a non-imaging receiver to obtain the spatial position.

In a research paper authored in part by two of the current inventors, the most promising method for VLP was identified as being the use of the angle of arrival (AOA) of the light (see J. Armstrong, Y. A. Sekercioglu, and A. Neild, "Visible light positioning: a roadmap for international standardization," IEEE Communications Magazine, vol. 51, no. 12, pp. 68-73, December 2013.).

In US patent publication no. US 2017/0363462 in the name of Jean Armstrong et al., there is described a general non-imaging receiver suitable for visible light communication systems that utilises an aperture provided over a photodetector layer. Light received from a luminaire and passing through the aperture will cast a light spot on the photodetector layer. A similar aperture receiver is described for use in visible light positioning applications in "H. Steendam, T. Q. Wang, and J. Armstrong, "Cramer-Rao bound for indoor visible light positioning using an aperture-based angular-diversity receiver", in 2016 IEEE International Conference on Communications (ICC), 2016, pp. 1-6". This general configuration has been further developed for use in VLP applications as a quadrant photodiode angular diversity aperture (QADA) receiver, which is described in S. Cincotta, A. Neild, C. He and J. Armstrong, "Visible light positioning using an aperture and a quadrant diode," 2017 IEEE Globecom Workshops, Singapore, Singapore, 2017, pp 1-6.

Figure 2:
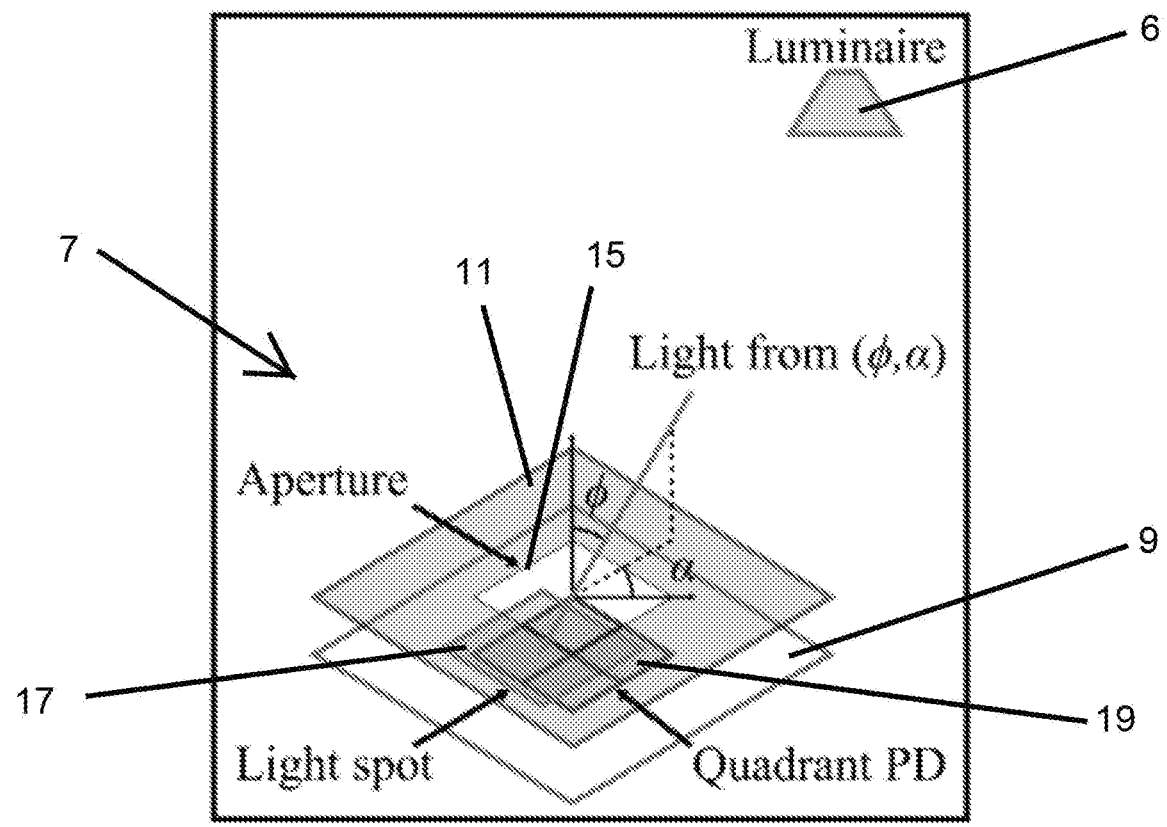
FIG. 2 shows a schematic view of a Quadrant Photodiode Angular Diversity Aperture (QADA) receiver.

FIG. 2 shows the various features of the non-imaging receiver 7 described in S. Cincotta et al., details of which are incorporated herein by reference. The receiver 7 includes a photodiode (PD) array consisting of four active areas to form a Quadrant PD 19 located at a PD plane 9 of the receiver 7.

Located in a parallel adjacent relationship to the PD plane 9 is an opaque screen 11 through which is provided an aperture 15. Light emitted from a modulated light source 6 can pass through the aperture 15 and cast a light spot 17 having the same shape as the aperture 15 on the quadrant PD 19. The opaque screen 11 is separated from the quadrant PD plane 9 by a pre-determined distance. The AOA of the light from the modulated light source 6 can then be determined based on the said pre-determined distance, and the displacement of the light spot 17 from the centre of the quadrant PD 19.

Combining a square shaped aperture 15 with a square quadrant PD 19 provides for the overlap area of the light spot 17 in each quadrant of the quadrant PD 19 to change linearly with the movement of the light spot 17 across the quadrant PD 19. S. Cincotta et al. details the algorithms used to determine the angle of arrival (AOA) of the incident light from the modulated light source 6, by determining both an incident angle θ, being the angle of arrival of the light relative to an axis extending perpendicular from the quadrant PD plane 9, and a polar angle α, being the angle of arrival of the light relative to an axis extending parallel to the quadrant PD plane 9. The non-imaging receiver 7 can therefore provide a rough estimation of the position of each modulated light source 6 relative to the receiver 7.

The present invention however also uses an imaging receiver (not shown) in the form of a digital camera, in addition to the non-imaging receiver 7 in the preferred form of the above described quadrant photodiode angular diversity aperture (QADA) receiver 7. The imaging receiver can obtain what is effectively a two dimensional map of the location of the luminaires 5 within the ceiling.

The QADA receiver 7 can receive the optical signals transmitted by the modulated light source 6 and can demodulate and decode the positional information carried by the modulated light signals. It can also use these signals to determine the angle of arrival of light from each modulated light source. The angle of arrival information obtained from the QADA can be used to identify the luminaires in the image captured by the imaging receiver. Triangulation of the locational information then allows the spatial position of the receiver arrangement 3 to be accurately determined.

The imaging receiver may conveniently be provided by the built in camera of a mobile phone. The configuration of the QADA receiver 7 is such that it could preferably be readily incorporated within a mobile phone near to the camera to thereby provide a receiver arrangement according to the present invention.

Each modulated light source 6 may also preferably provide information on one or more 'reference points' to further improve the spatial position determination accuracy. The modulated light sources 6 have associated reference points 8 which in some instances can be used to assist the positioning process. These reference points can be identified within an image of the luminaires and may be very specific features or could be a default position such as the centroid of the luminaire 5.

Whilst this discussion is in the context of VLP, it is not necessarily the case that the modulated light sources 6 or the reference points 8 would need to be either part of the luminaires 5 providing room lighting or operate at optical wavelengths which are visible to the human eye. They could, for instance, utilise infrared light sources which may or may not be included in luminaires. Regardless of this distinction, the receiving methodology would remain the same except for a shift in sensitivity to the required optical wavelength range.

Figure 3:
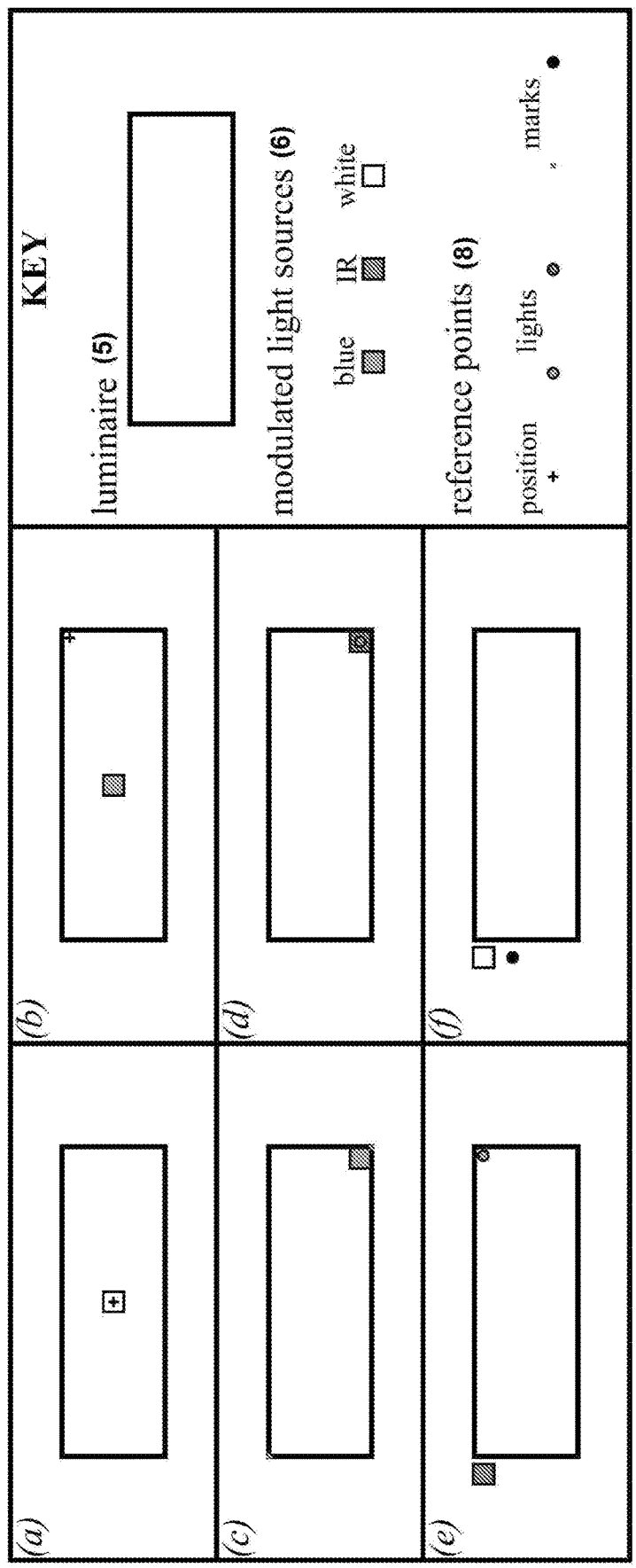
FIG. 3 is a diagram showing a series of different reference points associated with a luminaire that could be used according to the present invention.

A modulated light source 6 associated with the luminaire 5 can be used to provide the reference point information. FIG. 3 (a) to (f) is a diagram showing a number of possible luminaire 5 and modulated light source 6 configurations for providing positional information of a reference point 8 associated with a luminaire 5. These configurations are shown by way of example only, and the present invention is not restricted to any one configuration. FIG. 3 (a) to (f) shows the luminaire 5 as being rectangular shaped and having an LED modulated light source 6 located within or immediately adjacent a periphery of the luminaire 5. FIG. 3 (a) shows the modulated light source 6 as a white LED located at the centroid of the luminaire 5 and providing positional information of the reference point 8 at the same centroid position. FIG. 3(b) shows a blue LED modulated light source 6 located at the centroid of the luminaire 5 and providing positional information of a reference point 8 at a specific corner of the luminaire 5. FIG. 3(c) shows a blue LED modulated light source 6 located at a corner of the luminaire 5 providing positional information of multiple reference points 8 shown as a series of red marks on the frame of the luminaire 5. FIG. 3(d) shows an IR modulated light source 6 located at a corner of the luminaire 5, and providing positional information of the IR modulated light source 6 as the reference point 8. The IR modulated light source 6 will emit light at a wavelength not visible to a human eye. FIG. 3(e) shows an external IR modulated light source 6 located immediately adjacent to and externally away from a corner of the luminaire 5, for providing positional information of a blue LED located at an opposing corner of the luminaire 5 as the reference point 8. FIG. 3(f) shows an external white LED modulated light source 6 located immediately adjacent to and externally away from the periphery of the luminaire 5, and providing positional information of a mark located adjacent the periphery of the luminaire 5 as the reference point 8.

Figure 4:
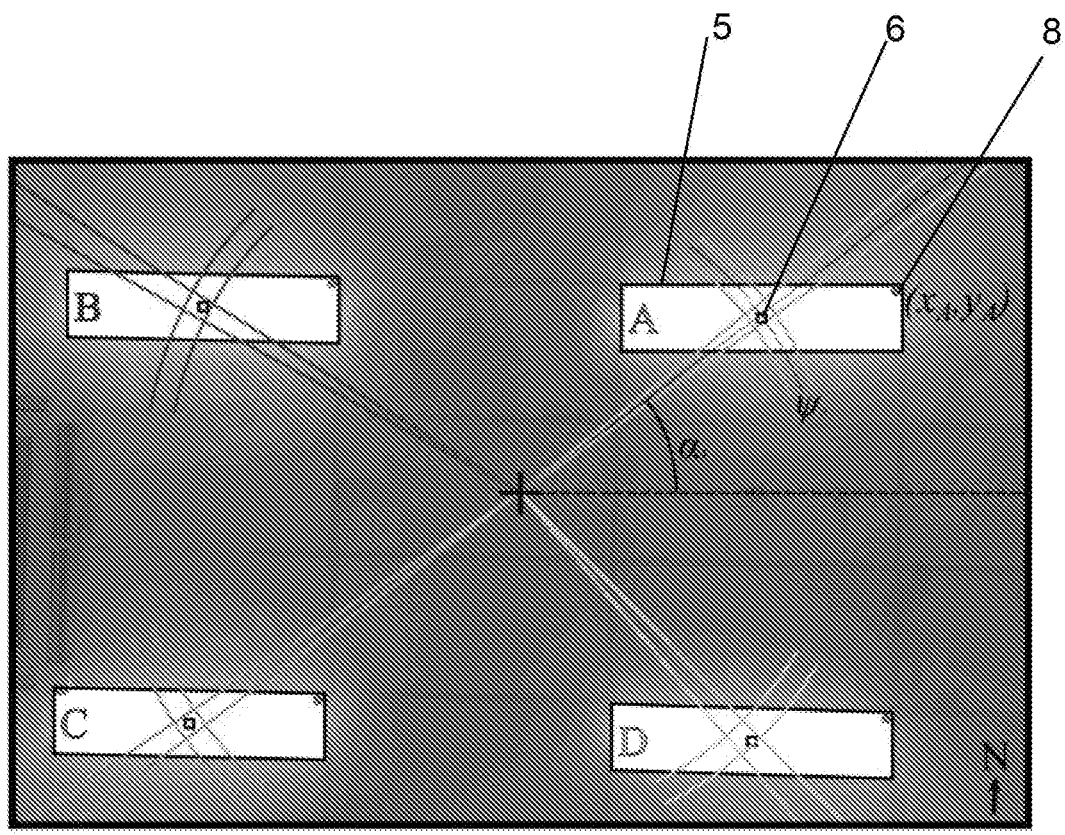
FIG. 4 is an image of the luminaires and associated modulated light sources overlaid with positional information obtained according to the present invention.

FIG. 4 shows an image captured by a mobile phone camera acting as the imaging receiver upon which is overlaid positional information obtained from the QADA receiver 7. The captured image shows four separate batten luminaires 5 (respectively marked 'A' to D'), with a LED at the centroid of each luminaire being used as the modulated light source 6. The overlay lines demonstrate how the incident and polar angle estimates from the QADA receiver 7 are used to locate the LED modulated light sources and, by extension, the luminaires, in the image plane. For example, the LED modulated light source 6 in luminaire A is estimated to have an incident angle of $\psi_1$, and a polar angle of a1. The overlaid lines represent the uncertainty in the estimation. This information is then matched with reference point position information decoded by the QADA receiver 7, the reference point being shown as a dot 8 at the corner of luminaire A and positioned at $x_A$, $y_A$. These values are then used to calculate the position of the receiver arrangement.

The combined use of information received from both an imaging receiver such as a camera, and a non-imaging receiver such as the above described QADA receiver 7 according to the present invention can provide more accurate determination of one's spatial location within an indoor environment.

Modifications and variations as would be deemed obvious to the person skilled in the art are included within the ambit of the present invention as claimed in the appended claims.

The invention claimed is:

1. A visible light positioning receiver arrangement for obtaining spatial position information of the receiver arrangement from a plurality of luminaires, at least one of the luminaires including at least one associated modulated light source for transmitting a light signal providing positional information of one or more reference points associated with that luminaire, said receiver arrangement including:
   an imaging receiver for capturing an image of the luminaires and associated said reference point(s); and a non-imaging receiver for estimating an angle of arrival (AOA) of light from each said modulated light source, and for decoding the reference point positional information therefrom;

wherein said AOA information and reference point positional information from the non-imaging receiver is matched to the image captured by the imaging receiver to obtain said spatial position information.

2. A visible light positioning receiver arrangement according to claim 1, wherein the imaging receiver is in the form of a camera.

3. A visible light positioning receiver arrangement according to claim 1, wherein the non-imaging receiver is in the form of an aperture receiver.

4. A visible light positioning receiver arrangement according to claim 3, wherein the aperture receiver is a quadrant angular diversity aperture receiver (QADA).

5. A visible light positioning receiver arrangement according to claim 1, wherein each said luminaire provides the modulated light source through modulation of the light from the said luminaire.

6. A visible light positioning receiver arrangement according to claim 1, wherein the modulated light source is located on or adjacent the luminaire.

7. A visible light positioning receiver arrangement according to claim 6, wherein the modulated light source emits IR or other light at a frequency not visible to a human eye.

8. A visible light positioning receiver arrangement according to claim 1, wherein the reference point is the location of the modulated light source.

9. A visible light positioning receiver arrangement according to claim 1, wherein the reference point is the location of a physical feature of the luminaire, such as the corner or centroid of the luminaire.

10. A visible light positioning receiver arrangement according to claim 1, wherein the reference point is one or more visible marks provide on or adjacent to the luminaire.

11. A visible light positioning method for obtaining spatial position information of a visible light positioning receiver arrangement from a plurality of luminaires, at least one of the luminaires including at least one associated modulated light source for transmitting a modulated light signal providing positional information of one or more reference points associated with the luminaire, the method including:

a) obtaining an image of multiple luminaires and associated said reference points using an imaging receiver of the receiver arrangement;

b) estimating angle of arrival (AOA) information from each said modulated light source using a non-imaging receiver of the receiver arrangement;

c) further using the non-imaging receiver to receive said reference point positional information transmitted from each said modulated light source; and d) matching said AOA information and reference point position information from the non-imaging receiver with the image captured by the imaging receiver to thereby obtain said spatial position information.

12. A visible light positioning method according to claim 11, wherein the imaging receiver is in the form of a camera.

13. A visible light positioning method according to claim 11, wherein the non imaging receiver is in the form of an aperture receiver.

14. A visible light positioning method according to claim 13, wherein the aperture receiver is a quadrant angular diversity aperture receiver (QADA).

15. A visible light positioning method according to claim 11, wherein each said luminaire provides the modulated light source through modulation of the light from the said luminaire.

16. A visible light positioning method according to claim 11, wherein the modulated light source is located on or adjacent the luminaire.

17. A visible light positioning method according to claim 16, wherein the modulated light source emits IR or other light at a frequency not visible to a human eye.

18. A visible light positioning method according to claim 11, wherein the reference point is the location of the modulated light source.

19. A visible light positioning method according to claim 11, wherein the reference point is the location of a physical feature of the luminaire such as the corner or centroid of the luminaire.

20. A visible light positioning method according to claim 11, wherein the reference point is one or more visible marks provide on or adjacent to the luminaire.

* * * * *